US009620020B2

(12) United States Patent
Wang et al.

(10) Patent No.: US 9,620,020 B2
(45) Date of Patent: Apr. 11, 2017

(54) COMMUNICATION-BASED MONITORING OF COMPLIANCE WITH AVIATION REGULATIONS AND OPERATING PROCEDURES

(71) Applicant: HONEYWELL INTERNATIONAL INC., Morristown, NJ (US)

(72) Inventors: Guoqing Wang, Beijing (CN); Chuan Jiang, Beijing (CN); Robert E De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/819,635

(22) Filed: Aug. 6, 2015

(65) Prior Publication Data

US 2017/0039858 A1    Feb. 9, 2017

(51) Int. Cl.
*G08B 21/00*    (2006.01)
*G08G 5/00*     (2006.01)
(Continued)

(52) U.S. Cl.
CPC ......... *G08G 5/0013* (2013.01); *G08G 5/0021* (2013.01); *G10L 25/51* (2013.01); *G10L 25/72* (2013.01); *G10L 2015/221* (2013.01)

(58) Field of Classification Search
CPC .... G08G 5/0013; G08G 5/0021; G10L 25/51; G10L 25/72; G10L 2015/221
See application file for complete search history.

(56) References Cited

U.S. PATENT DOCUMENTS

| 5,416,705 A | 5/1995 | Barnett |
| 5,844,503 A | 12/1998 | Riley et al. |

(Continued)

FOREIGN PATENT DOCUMENTS

| CN | 1372127 A | 10/2002 |
| CN | 101996474 B | 10/2012 |
| EP | 2674926 A1 | 12/2013 |

OTHER PUBLICATIONS

Barbato, G.; Integrating Voice Recognition and Automatic Target Cueing to Improve Aircrew-System Collaboration for Air-To-Ground Attack; Air Force Research Laboratory, Wright-Patterson AFB, Ohio, USA; Paper presented at the RTO SCI Symposium on Sensor Data Fusion and Integration of the Human Element, held in Ottawa, Canada, Sep. 14-17, 1998, and Published in RTO MP-12.

(Continued)

*Primary Examiner* — Erin File
(74) *Attorney, Agent, or Firm* — Lorenz & Kopf, LLP

(57) ABSTRACT

A method for detecting noncompliance with aviation regulations and operating procedures is disclosed herein. The method analyzes communication associated with a host aircraft to identify key information, stores the identified key information in a data storage device, and determines whether a particular aviation regulation or operating procedure applies to the host aircraft. After determining that a regulation or operating procedure applies, the stored key information is compared against reference information maintained in a database in association with the regulation or operating procedure. An alert is generated when the comparing detects a discrepancy between the stored key information and the reference information.

20 Claims, 2 Drawing Sheets

(51) Int. Cl.
*G10L 25/51* (2013.01)
*G10L 25/72* (2013.01)
*G10L 15/22* (2006.01)

(56) References Cited

U.S. PATENT DOCUMENTS

| | | | |
|---|---|---|---|
| 5,926,790 | A | 7/1999 | Wright |
| 6,236,913 | B1 | 5/2001 | Bomans et al. |
| 6,380,869 | B1 | 4/2002 | Simon et al. |
| 6,720,890 | B1 | 4/2004 | Ezroni et al. |
| 6,885,921 | B1* | 4/2005 | Farmer ............... G06Q 10/06 340/945 |
| 7,089,108 | B2 | 8/2006 | Merritt |
| 7,415,326 | B2 | 8/2008 | Komer et al. |
| 7,606,715 | B1 | 10/2009 | Krenz |
| 7,764,812 | B2 | 7/2010 | McQuaide, Jr. |
| 7,809,405 | B1 | 10/2010 | Rand et al. |
| 7,912,592 | B2 | 3/2011 | Komer et al. |
| 8,370,157 | B2* | 2/2013 | Boregowda ........... G10L 15/063 704/226 |
| 8,514,104 | B1 | 8/2013 | Dirks et al. |
| 8,521,510 | B2 | 8/2013 | Gilbert et al. |
| 2003/0025682 | A1 | 2/2003 | Dame |
| 2003/0034902 | A1* | 2/2003 | Dickau ............. B64D 45/0015 340/945 |
| 2003/0193408 | A1 | 10/2003 | Brown et al. |
| 2003/0204556 | A1 | 10/2003 | Bernard |
| 2004/0245409 | A1* | 12/2004 | Cordina ............ B64D 45/0015 244/185 |
| 2007/0241936 | A1 | 10/2007 | Arthur et al. |
| 2007/0288129 | A1* | 12/2007 | Komer .................. G10L 15/26 701/3 |
| 2008/0114603 | A1 | 5/2008 | Desrochers |
| 2008/0221886 | A1 | 9/2008 | Colin et al. |
| 2009/0306839 | A1* | 12/2009 | Youngquist ........... G01K 7/021 701/14 |
| 2009/0310530 | A1* | 12/2009 | Cerra, II ........... H04B 7/18508 370/316 |
| 2010/0027768 | A1 | 2/2010 | Foskett |
| 2011/0125503 | A1 | 5/2011 | Dong et al. |
| 2011/0313597 | A1* | 12/2011 | Wilson .................. G01C 23/00 701/3 |
| 2015/0081138 | A1 | 3/2015 | Lacko et al. |
| 2016/0077523 | A1* | 3/2016 | Zygmant ............. G08G 5/0013 701/2 |
| 2016/0174075 | A1* | 6/2016 | Bolton .................. H04L 63/10 726/5 |
| 2016/0179327 | A1* | 6/2016 | Zammit-Mangion .. G01C 23/00 701/7 |

OTHER PUBLICATIONS

Helleberg, J. R. et al: "Effects of Data-Link Modality and Display Redundancy on Pilot Performance: An Attentional Perspective" The International Journal of Aviation Psychology, 13(3), 189-210, 2003, Lawrence Erlbaum Associates, Inc.

Zokić, M., et al.: "Say Again" International Journal of Education and Information Technologies, Issue 4, vol. 6, 2012.

Lacko, I. et al. "Aircraft Systems and Methods for Detecting Non-Compliant Pilot Action", USPTO patent application filed on Sep. 18, 2013 and assigned U.S. Appl. No. 14/030,426.

Mohideen, M.I.; Aircraft Systems and Methods for Reducing and Detecting Read-Back and Hear-Back Errors, USPTO patent application filed on Nov. 14, 2013 and assigned U.S. Appl No. 14/080,187.

USPTO Notice of Allowance for U.S. Appl. No. 14/030,426, date mailed May 19, 2016.

USPTO Office Action for U.S. Appl. No. 14/030,426 dated Apr. 23, 2015.

EP Extended Search Report for Application No. 14182696.6 dated Mar. 16, 2015.

EP Extended Search Report for Application No. 14188558.2 dated Mar. 10, 2015.

USPTO Office Action for U.S. Appl. No. 14/080,187, dated mailed May 25, 2016.

USPTO Final Office Action for U.S. Appl. No. 14/080,187 dated Dec. 15, 2016.

* cited by examiner

COMMUNICATION-BASED MONITORING OF COMPLIANCE WITH AVIATION REGULATIONS AND OPERATING PROCEDURES

TECHNICAL FIELD

Embodiments of the subject matter described herein relate generally to avionic systems. More particularly, embodiments of the subject matter relate to systems and methods for detecting pilot compliance by monitoring cockpit communications.

BACKGROUND

The cross-checking process is used in aviation environments to reduce the likelihood of errors. The ultimate goal of a cross-check is to prevent errors related to execution of a collaborative decision by involving another party into the action execution. The cross-checking process conventionally involves verbal and visual verification of an intended action in the cockpit prior to its execution. Even though cockpit systems are in many cases "smart" enough to not allow execution of a hazardous action by a flight crew member (system-based crosscheck), many actions still rely on pilot verification of the action correctness (human-based crosscheck).

The cross-checking process is a vital element in a pilot's duties, particularly in a multi-crew situation. There is typically a minimum list of defined actions which are to be cross-checked. For example, air traffic control (ATC) clearances and other requests/instructions will normally be monitored by both pilots, and consequent pilot action taken by the pilot flying (PF) will be confirmed or monitored by the pilot not flying (PNF). Equipment settings, such as altimeter pressure settings, cleared altitude, frequency change, and navigation routings are also typically set by the PNF and cross-checked by the PF, or vice versa. In single pilot operations (SPO), there is no cross-checking second pilot.

Unfortunately, while the cross-checking process can significantly reduce the likelihood of errors, there are many examples where human-based cross-checking may not be adequate. The human mind is fallible and human error can occur for many reasons. For example, the cross-checking process may fail because of a misheard message, fatigue, a memory lapse, incorrect or incomplete appreciation of the situation, insufficient cross-check, language barriers, distraction, communication problems, ineffective monitoring, data use error, non-compliance with standard operating procedures (SOPs), etc. Cross-checking errors are more likely in certain circumstances such as when there is pressure to complete an action quickly (e.g., to expedite departure or during an emergency or abnormal situation), but may also occur in normal daily situations.

Accordingly, it is desirable to provide aircraft systems and methods for detecting non-compliant pilot action. In addition, it is desirable to provide methods and systems for cross-checking compliance with aviation regulations, airspace restrictions, and the like. Furthermore, other desirable features and characteristics of the methods and systems will become apparent from the subsequent detailed description and the appended claims, taken in conjunction with the accompanying drawings and the preceding background.

BRIEF SUMMARY

A computer-implemented method for detecting noncompliance with aviation regulations and operating procedures is presented herein. The method analyzes communication associated with a host aircraft to identify key information contained in the communication, and stores the identified key information in a data storage device to obtain stored key information. The method continues by determining that a particular aviation regulation or operating procedure applies to the host aircraft. After making the determination, the method compares the stored key information against reference information maintained in a database in association with the particular aviation regulation or operating procedure. An alert is generated when the comparing detects a discrepancy between the stored key information and the reference information.

Also presented herein is a tangible and non-transitory electronic storage medium having processor-executable instructions that, when executed by a processor architecture comprising at least one processor device, are capable of performing the method of detecting noncompliance with aviation regulations and operating procedures.

Also presented herein is a computer-implemented system for detecting noncompliance with aviation regulations and operating procedures. The system includes a processor architecture having at least one processor device, and at least one data storage device associated with the processor architecture. The at least one data storage device stores processor-executable instructions that, when executed by the processor architecture, perform the method of detecting noncompliance with aviation regulations and operating procedures.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
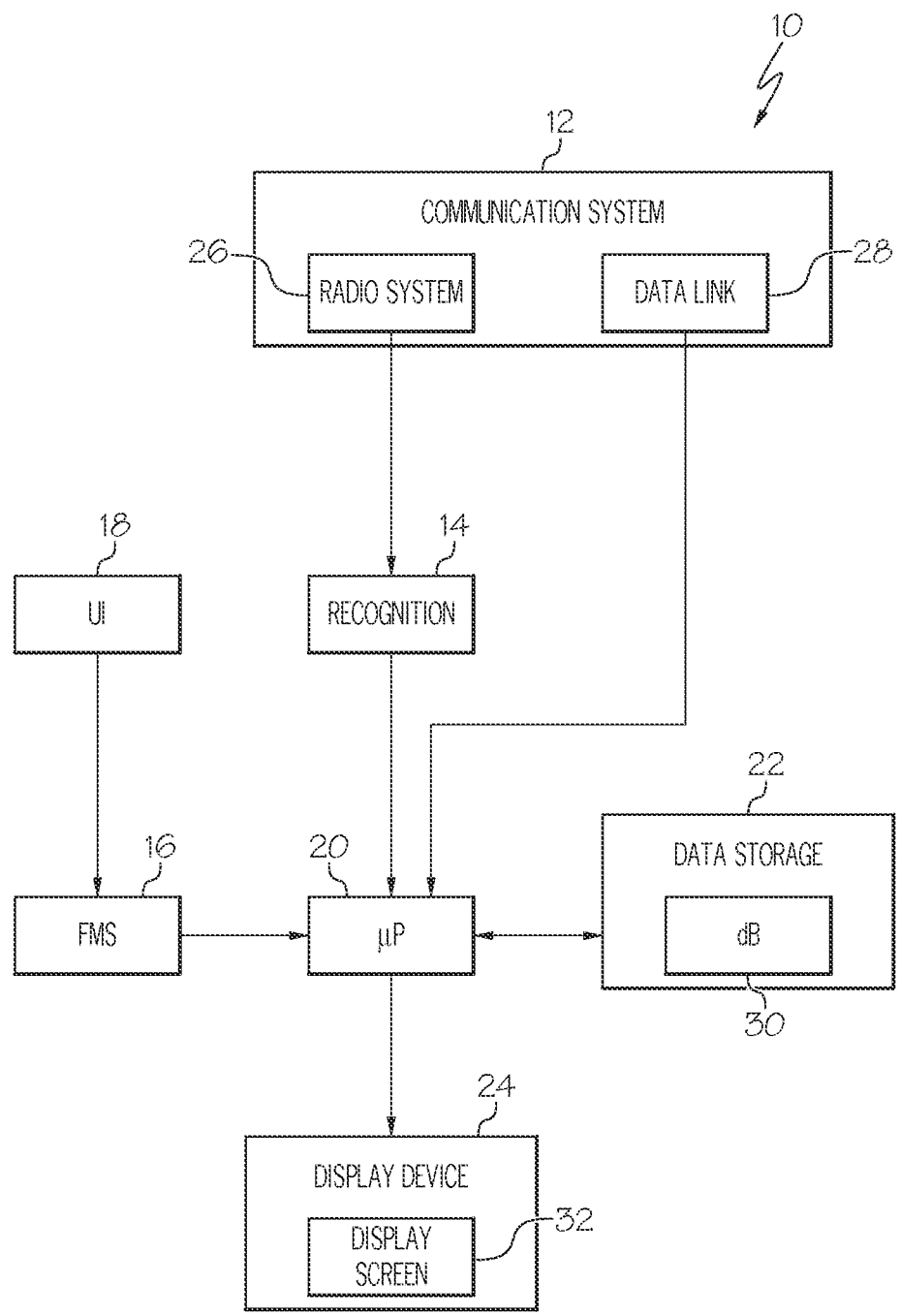
FIG. 1 is a schematic diagram of a computer-implemented system for detecting non-compliant pilot action, according to an exemplary embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, certain features of the systems described herein can be represented by the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Various embodiments are directed to methods and systems for detecting non-compliant pilot action. In particular, the systems and methodologies presented herein can be utilized to confirm whether or not a pilot has complied with applicable aviation regulations, operating procedures, and the like. Such methods and systems provide an additional cross-check, which is particularly helpful in Single Pilot Operations. By detecting non-compliant pilot action, the methods and systems as described herein help correct non-compliant pilot action, thereby resulting in increased flight safety and efficiency through more effective communications. While systems and methods for detecting non-compliant "pilot" action are hereinafter described, it is to be understood that such systems and methods may be used for detecting non-compliant action taken by a flight member other than the pilot.

Requests for pilot action may originate from a ground location such as air traffic control (ATC), or from another source. While the term "request" for pilot action is used herein, it is to be understood that any inbound communication to the aircraft that must be acknowledged in some manner by the pilot in an outbound communication from the aircraft is included, whether it is literally an instruction, a request, a command, or the like. The term "pilot action" refers to the action that is taken by the "pilot" and intended to be compliant with the inbound communication from ATC or another source. In accordance with exemplary embodiment, "pilot action" refers to a parameter as hereinafter described and a value associated with the parameter (i.e., a "parameter value"). "Non-compliant pilot action" for this scenario may include a failure to correctly follow an ATC request (i.e., a failure to take the correct pilot action), a failure to follow an ATC request after acknowledgement thereof by the pilot resulting in a timeout alert (i.e., a failure to take the pilot action), or both. As explained in more detail below, non-compliant action may also be associated with failure to comply with certain aviation regulations or operating procedures, and such non-compliant action can be detected by monitoring other forms of cockpit communication (inbound and/or outbound communication).

The system and methodologies described herein can analyze various types of cockpit communication for purposes of performing consistency checks. In this regard, the monitored communication may include speech, voice radio communication, electronic communication (e.g., datalink communication), or the like. For example, some or all of the following communication types can be considered, without limitation: instructions received from ATC, such as ARTCCs, towers, FSSs, Central Flow, and Operations Centers; flight crew responses to ATC instructions, wherein a response can include instruction or clearance read back, information acknowledgement, and instruction rejections; other flight crew and ground crew conversations over UNICOM; ground broadcast information from ATC, such as wind information, barometric correction settings, and the like, ATIS, UNICOM, ASOS, AWSS, and AWOS; flight crew self-announced information on CTAF, which may include UNICOM, MULTICOM, FSS, tower frequency, and other air-to-air communication (122.75 for private fixed wing aircraft, 123.025 for general aviation helicopters, etc.).

As used herein, an "aviation regulation" is a rule or directive that is produced and published by a recognized authority, such as a Federal Aviation Regulation (FAR) for the United States.

As used herein, an "aviation operating procedure" refers to a recommended and common piloting practice, which can be defined by one or more aviation regulations. For example, FAR Part 91 relates to general operating and flight rules.

The system may be utilized in aircraft, such as a helicopter, airplane, or unmanned vehicle. Moreover, exemplary embodiments of the system may also be utilized in spacecraft, watercraft, submarines, and other types of vehicles, in addition to machine operation. For simplicity, the non-limiting embodiments are described below with reference to aircraft.

FIG. 1 is a simplified functional block diagram of a computer-implemented system 10 for detecting non-compliant pilot action, according to exemplary embodiments of the present invention. The system 10 includes multiple components, each of which may be configured for mounting in a host aircraft. In some embodiments, the system 10 may be a self-contained system such that each of the components described below is contained in a single housing and is dedicated exclusively to serving the functions of the system 10. In other embodiments, the various components described below may be standalone components or they may be components that are used as part of other systems and which are configured to be used as a shared resource between such other systems and the system 10. For example, the system 10 can be realized using an integrated avionic system, or it can also be a laptop computer, a tablet computer, or a mobile device that interfaces to various onboard avionics systems and sensors, and that has been programmed in a particular manner to support the specialized functions and features described in more detail below.

In the embodiment illustrated in FIG. 1, the system 10 includes a communication system 12, a recognition module 14 (which can detect, recognize, or otherwise analyze speech, voice radio communication, navigation aid signals, or the like), a flight management system 16, a user interface 18, a processor device 20, a data storage device 22, and a display device 24. In other embodiments, the system 10 may include either additional or fewer components. For example, the system 10 can include other annunciation or notification devices or components in addition to, or in lieu of, the display device 24. The system 10 may be arranged as a single system on a data communications bus or systems bus or in an arrangement whereby one or more of the communication system 12, the processor device 20, the speech recognition module 14, the data storage device 22, the flight management system 16, the display device 24, and the user interface 18 are separate components or subcomponents of another system located either onboard or external to an aircraft. It should be understood that FIG. 1 is a simplified representation of the system 10 for purposes of explanation and ease of description, and that FIG. 1 is not intended to limit the application or scope of the subject matter in any way. In practice, while not illustrated, the system 10 and/or the host aircraft may include either additional or fewer devices, components, and databases for providing system functions and features, as will be appreciated in the art.

Still referring to FIG. 1, in exemplary embodiments, the communication system 12 is suitably configured to support communications between the aircraft (e.g., the pilot or the flight crew) and one or more ground locations (e.g., ATC). The communication 12 can also be configured to support air-to-air communication. The communication system 12 may be realized using a radio communication system 26 and/or a datalink system 28 (as hereinafter described). In accordance with certain embodiments, the communication system 12 can support any number of communication protocols, methodologies, and technologies, as is well understood. For example, the communication system 12 can support any or all of the following, without limitation: intercomm communication; satellite voice communication; radio communication; navigation radio communication; VHF datalink communication; satellite data communication; aircraft-to-aircraft communication; and the like.

Communication from a ground location to the aircraft is referred to herein as an "inbound communication". Communication received at the host aircraft from a neighboring aircraft (air-to-air transmission) is also considered to be an "inbound communication". Communication from the host aircraft to a ground location or another aircraft is referred to herein as an "outbound communication." The standard method of communication between ATC and the pilot is voice radio, using the radio communication system 26 (VHF bands for line-of sight communication, or HF bands for long-distance communication, or satellite communication). The radio communication system 26 in the cockpit may include, for example, a conventional speaker and microphone that may be combined in an aviation headset (not shown), a radio receiver (not shown), and a push-to-talk (PTT) switch (not shown).

The sequence of messages between the aircraft and the ground location relating to a particular transaction (for example a request for pilot action and acknowledgment of the request) is termed a "dialog". There can be several sequences of messages in the dialog, each of which is closed by means of appropriate messages, usually of acknowledgement or acceptance. All exchanges of messages between the aircraft and the ground location can be viewed as dialogs. The messages may relate to a variety of parameters such as a heading, an altitude, attitude, flight level, or QNH, and a parameter value associated therewith. For example, the air traffic controller (ATCO) is provided with the capability to issue level assignments, crossing constraints, lateral deviations, route changes and clearances, speed assignments, radio frequency assignments, various requests for information, etc. The pilot is provided with the capability to acknowledge the request for pilot action, respond to messages, to request clearances and information, to report information, and to declare/rescind an emergency. Passively received ground broadcasts or communication between the aircraft and a ground-based "non-control" facility can also be considered as another important source of information that can be monitored by the system described herein.

Controller-pilot datalink communications (CPDLC) are digital communications and are another method of communication between the ATC and the pilot, using the datalink system 28 for such digital communication. For example, the ATC can select from a set of messages and send the digital communications to the aircraft (via the processor device 20 in this case). The flight crew will respond with an acknowledgment, such as ROGER, WILCO, STANDBY, or NEGATIVE. The pilot is, in addition, provided with the capability to request conditional clearances (downstream) and information from a downstream air traffic service unit (ATSU). A "free text" capability is also provided to exchange information not conforming to defined formats. An auxiliary capability is provided to allow a ground system to use the datalink system to forward a CPDLC message to another ground system. The cockpit includes a datalink control and display device (not shown) that serves as the CPDLC interface for sending and receiving CPDLC messages. The datalink system 28 sends digital signals from the CPDLC for processing by the processor as hereinafter described.

The system can also monitor and process navigational aid broadcast information if so desired. In this regard, a VOR system, a DME system, and an NDB system normally transmit audible Morse code along with the navigational aid signals to assist the pilot in positively identifying the correctness of the tuned navigational aid, and to confirm its healthy status. Monitoring and analyzing this type of navigation system broadcast information can be performed to check compliance with aviation regulations and/or operating procedures as needed.

The speech recognition module 14 monitors audible communications (inbound and/or outbound) to detect when certain words, phrases, letters, etc. are annunciated. As explained in more detail below, the speech recognition module 14 can be suitably designed to "listen" for particular keywords or key phrases that implicate compliance (or noncompliance) with aviation regulations and operating procedures that may be currently applicable. The speech recognition module 14 is known and generally comprises a speech input module configured to produce a digital signal derived from a voice communication, and a speech processing module operatively coupled to the speech input module. The digitized speech sample can be compared against a library of stored samples that correspond to sounds, words, phrases, letters, codes, waypoint identifiers, airport identifiers, geographical identifiers, or the like. In some embodiments, the speech recognition module 14 may include a dedicated processor, a microprocessor, circuitry, or some other processing component. In some embodiments, the speech recognition module 14 is configured to produce digital data that represents certain content (words or phrases) corresponding to the voice communications between ATC and the pilot. The speech recognition module 14 is configured to send the digital signal to the processor device 20 as hereinafter described.

The flight management system 16 is as known to one skilled in the art. The flight management system 16 includes the flight guidance control system for the host aircraft. The flight management system 16 is coupled to the processor device 20 and may provide navigation data associated with the aircraft's current position and flight direction (e.g., heading, course, track, etc.) to the processor device 20. The navigation data provided to the processor device 20 may also include information about the aircraft's airspeed, altitude, pitch, flight path, intended destination, takeoff and landing information, and other important flight information, some of which is obtained from various sensors, devices, subsystems, or components onboard the host aircraft. In practice, the flight management system 16 may generate a flight plan for the aircraft that includes segments between waypoints forming a flight path to a destination. The flight management system 16 may include any suitable position and direction determination devices that are capable of providing the processor device 20 with at least the current position of the aircraft, the real-time direction of the aircraft in its flight path, the waypoints along the flight path, and other important flight information (e.g., elevation, pitch, airspeed, altitude, attitude, etc.). Information can be provided to the processor device 20 by, for example, an Inertial Reference System (IRS), Air-data Heading Reference System (AHRS), and/or a global positioning system (GPS).

In general, the user interface 18 is coupled to the flight management system 16 and is located within the cockpit of the aircraft. The user interface 18 and the flight management system 16 are cooperatively configured to allow a user (e.g., a pilot or other flight crew member) to interact with the flight management system 16 and other components of the system 10 as hereinafter described. In accordance with an exemplary embodiment, the user interface 18 may be realized as a flight guidance control panel (FGCP) (or simply "guidance panel") as known in the art. The user interface 18 may also be realized by a Control Display Unit (CDU) or Multifunction Control Display Unit (MCDU). These both allow for input of parameters to the flight management system. In addition, the MCDU also allows for input to and control of radios, CPDLC, aircraft performance parameters, etc. The FGCP facilitates user control of the flight control or autopilot system. In a typical operating scenario, the FGCP enables the user to control altitude, airspeed, heading/course, and vertical speed/flight path angle (along with certain selectable combinations of these options). On the FGCP are controls and switches for setting different operational modes, parameters, and parameter values, etc. Pilot action may include the setting of parameters and parameter values on the guidance panel or elsewhere.

The system 10 includes a suitably configured and arranged processor architecture having at least one processor device 20. Although FIG. 1 shows a simplified implementation having only one processor device 20, the processor architecture can employ any number of distinct processor devices 20. The processor device 20 may be any type of computing component, computing architecture or subsystem, microprocessor, collection of logic devices, or any other analog or digital circuitry that is configured to calculate, and/or to perform algorithms, and/or to execute software applications, and/or to execute sub-routines, and/or to be loaded with and to execute any type of computer program. In this regard, the processor device 20 can execute computer program instructions that are stored on a tangible storage medium, such as a hard drive, an optical disc, a memory chip or device, and the like. The processor device 20 may comprise a single processor or a plurality of processors acting in concert. In some embodiments, the processor device 20 may be dedicated for use exclusively with the system 10 while in other embodiments the processor device 20 may be shared with other systems on board the aircraft. In still other embodiments, the processor device 20 may be integrated into any of the other components of the system 10. For example, in some embodiments, the processor device 20 may be a component of the speech recognition module 14.

The processor device 20 is communicatively coupled to the datalink system 28, the speech recognition module 14, and the data storage device 22, and is operatively coupled to the display device 24. Such communicative and operative connections may be effected through the use of any suitable means of transmission including both wired and wireless connections. For example, each component may be physically connected to the processor device 20 via a coaxial cable or via any other type of wire connection effective to convey electronic signals. In other embodiments, each component may be communicatively connected to the processor device 20 across a bus or other similar communication corridor. Examples of suitable wireless connections include, but are not limited to, a Bluetooth connection, a Wi-Fi connection, an infrared connection or the like.

Being communicatively and/or operatively coupled with the datalink system 28, the speech recognition module 14, data storage device 22, and display device 24 provide the processor device 20 with a pathway for the receipt and transmission of signals, commands, instructions, and interrogations to and from and each of the other components. The processor device 20 is configured (i.e., being loaded with and being capable of executing suitable computer code, software and/or applications) to interact with and to coordinate with each of the other components of the system 10 for the purpose of detecting non-compliant pilot action as hereinafter described.

The processor device 20 accesses or includes the data storage device 22, which stores and maintains a database 30 with digital data relating to the communication of interest (e.g., the inbound and outbound communications) between the aircraft and the ground location. The data storage device 22 may be a memory device (e.g., non-volatile memory, disk drive, tape, optical storage device, mass storage device, etc.) that stores and updates the data as needed. The database 30 can be considered to be a library of sorts, wherein the library includes relevant keywords, phrases, call letters, codes, and/or other audibly distinguishable information that is relevant to aviation regulations and operating procedures applicable to the aircraft at any given time. For example, the data contained in the library may represent such information as the source of the inbound communication (e.g., ATC, pilot), the parameter that is the subject of a request for pilot action (e.g., ALTITUDE, HEADING, ATTITUDE, FLIGHT LEVEL, QNH, SPEED, TRANSPONDER SETTING, FREQUENCY CHANGE, MONITOR, etc.), the parameter value (e.g., 180°, 10000 feet, etc.), words or phrases associated with the acknowledgement of the request for pilot action (e.g., ROGER, WILCO, STANDBY, and NEGATIVE), the name or identity of the entity initiating a communication, the name or identity of the entity being called, the name or identity of a destination of the aircraft (e.g., an airport name or call letters, a waypoint name or call letters, a city, etc.), or the tail number of the aircraft. The database 30 can also be utilized to store other types of reference data, or the system can utilize or cooperate with additional databases if so desired. For example, the system can include or cooperate with one or more of the following, without limitation: a navigation database; an airport database; databases that contain communication target frequencies; databases for national airspace systems. The system can employ any number of distinct and separate databases, depending on the configuration of the particular embodiment, and depending on the type of regulation or operating procedure being checked.

The data storage device 22 (or another memory device or component) can represent a tangible and non-transitory electronic storage medium having processor-executable instructions stored thereon. When such instructions are executed by a processor architecture including at least one processor device (such as the processor device 20), they are capable of performing the various methods, processes, and functions described in more detail herein. In this regard, the system 10 can be programmed to execute software that effectively transforms what might be a general purpose computing platform into a specialized piece of equipment that supports the techniques, technologies, and methodologies presented herein.

Generally, the processor device 20 receives and/or retrieves avionics, navigation, and flight management information (e.g., from the flight management system 16, the communications system 12, or both), and information relating to the inbound and outbound communications (e.g., from the recognition module 14, the datalink system 28, and/or the data storage device 22 to the extent historical or buffered data is processed). In some embodiments, the processor device 20 executes computer readable instructions to compare a request for pilot action against the actual pilot action taken and determine if there is a discrepancy between the request for pilot action and the pilot action taken. In certain embodiments, the processor device 20 executes computer readable instructions to confirm whether or not any communication that is required or recommended by aviation regulations or operating procedures has actually been performed. The system 10 outputs a discrepancy alert if, as a result of a comparison, a determination is made that there is some inconsistency, non-compliance by the pilot or flight crew, or the like. For example, if the ATCO communicates a request for the pilot to fly heading 100°, and the pilot sets a heading of 110° (e.g., on the guidance panel 34), the system 10 can output a discrepancy alert. As another example, if an aviation regulation mandates that a pilot initiate communication with the ATCO for a given situation, and the system 10 determines that no communication has been established, then the system 10 can generate an alert or display a reminder message, as appropriate.

The system 10 can also compare the inbound and outbound communications of a dialog and determine if there is a discrepancy between them (assuming that the discrepancy is not otherwise detected at or by the ground location). The system 10 can output a discrepancy alert if, as a result of the comparison, a determination is made that there is a difference between the inbound and outbound communications. For example, if the ATCO communicates a request for the pilot to fly at a heading of 100° and the pilot acknowledges a heading of 110° (before taking any action), the processor would output a discrepancy alert because there is a difference between the inbound and outbound communications between the ATCO and the pilot.

A discrepancy alert generated by the system 10 may be, for example, a visual discrepancy alert, an aural discrepancy alert, a tactile discrepancy alert, combinations thereof, etc. It should be understood that the exemplary techniques for outputting the discrepancy alert described above are exemplary and do not comprise an exhaustive list of techniques that may be employed by the system 10 to output the discrepancy alert(s). The system can use the display device 24 to generate visual alerts. Other devices, components, or subsystems (not shown in FIG. 1) can be employed to generate other types of alerts as needed.

The processor device 20 may also function as a graphics display generator to generate display commands based on algorithms or other machine instructions stored in association with the processor device 20. In this regard, the processor device 20 can serve as a graphics driver to operate the display device 24. The display device 24 may include any device or apparatus suitable for displaying flight information or other data associated with operation of the aircraft. In accordance with exemplary embodiments, display commands may also represent visual discrepancy and timeout alerts. The processor device 20 generates the display commands representing this data, and sends the display commands to the display device 24 if visual alerts are to be outputted.

In accordance with an exemplary embodiment, the display device 24 is an aircraft flight display located within a cockpit of the aircraft. The display device 24 may be implemented using any one of numerous known display devices suitable for rendering textual, graphic, and/or iconic information in a format viewable by the pilot or other flight crew member. Non-limiting examples of such display devices include various cathode ray tube (CRT) displays, and various flat panel displays such as various types of LCD (liquid crystal display) and TFT (Thin Film Transistor) displays. In stand-alone implementations, the display device 24 can be realized as a laptop screen, a tablet computer touchscreen, or a mobile device screen. The display device 24 may additionally be implemented as a panel mounted display, a HUD (Head-Up Display) Projection, or any one of numerous known technologies. It is additionally noted that the display device may be configured as any one of numerous types of aircraft flight deck displays. For example, it may be configured as a multi-function display, a horizontal situation indicator, or a vertical situation indicator. Regardless of how the display device 24 is implemented, it can include a display screen 32, which is controlled by the display device 24 and is used to render any type of image including, but not limited to, textual, graphics, and iconic information. In some embodiments, the display device 24 may include multiple display screens 32.

In certain embodiments, the processor device 20 can output a timeout alert if a set time limit to take pilot action is exceeded. The timeout alert reminds the pilot to take action (e.g., change flight settings, perform certain operations, or the like) after having acknowledged a request for pilot action. For example, in a situation where the received command is "Cross (waypoint) at 15,000 feet", the systems may look to see if there is a setting in the FMS for that restriction, in the case the FMS is engaged. The system may look at the guidance control panel to see if the aircraft is in an altitude hold condition, with the correct setting, if the GCP is engaged, or the system can actively watch the altimeter during manually controlled flight, and decide if the trending aircraft position will meet the command. In any case, the system can look at the speed of the aircraft and decide a certain time or distance before the waypoint that the command will likely not be met and alert the pilot. A timeout alert may be, for example, a visual timeout alert, an aural timeout alert, a tactile timeout alert, an augmented reality timeout alert, or combinations thereof. For example, a visual timeout alert can be displayed on a crew alerting system (CAS) window on the display screen 32.

The system may also create an alert based upon aircraft position. For instance, if the pilot receives an instruction to "Report reaching Flight Level 250", then the system can monitor aircraft altitude and look for an action from the pilot when the altitude is reached. If the pilot does not take action to notify ATC that the altitude has been reached, then an alert can be generated. The same behavior can apply to any horizontal aircraft position. It should be understood that an alert, reminder, or message can be generated and rendered using any suitable methodology or technology.

The system 10 is designed and configured to execute specialized computer software to monitor pilot/crew compliance with applicable aviation regulations and operating procedures. Certain aviation regulations and operating procedures require (or recommend) communication between the host aircraft and another party, typically the ATC or another ground-based entity. In many situations, the mandatory communication will include predictable or predetermined words, phrases, call letters, or the like. For example, an aviation regulation may require the pilot to identify a destination airport by name, such as "PHOENIX" or "GLENDALE". As another example an aviation operating procedure may recommend a communication that includes "FREQUENCY CHANGE APPROVED" before a switch to another frequency when the aircraft is departing but still within Class D airspace. In this context, aviation regulations and operating procedures of interest can be characterized by expected or predictable content, which may be audible or electronically detectable. The content (or a portion thereof) may be the same for a regulation or procedure across different flights and aircraft, or it may vary from one flight to another and/or from one aircraft to another. For example, the intended destination of the host aircraft can change depending on the flight plan and the current position of the host aircraft. Conversely, if a given regulation or operating procedure applies to one and only one destination airport, then the name of that airport can be considered to be a fixed parameter for purposes of the compliance monitoring methodology described herein.

The system 10 and related methodologies described herein are applied to monitor cockpit communication, extract key information from the monitored communication, and verify the consistency of past, present, and future flight crew operations, and onboard system status, to the identified key information. This allows the onboard system to report any inconsistencies and issue alerts as needed. In certain embodiments, the system 10 analyzes voice radio communication and various datalink communications, which can include (but are not limited to) the following: instructions received from ATC; flight crew responses to ATC instructions, e.g., instruction or clearance read back, information acknowledgement, and instruction rejections; flight crew and ground crew conversations using the UNICOM system; ground broadcast information from a manned or automated equipment or facility; and self-announced information from the flight crew.

Although the exemplary embodiments described here typically monitor and analyze speech and datalink information, the navigation radio of the aircraft may transmit identification information which can be received by the onboard communication system, e.g., Morse code station identification. This type of information is also valuable to the proposed functionality of the system 10, which can check in the background if an intended navigation aid is functioning normally.

In certain implementations, the speech recognition module 14 is suitably configured to carry out "template free" information identification. In this regard, traditional speech recognition techniques utilized in the aviation industry usually rely on templates of known voice commands or a limited syntax set for extracting commands or critical information from the monitored speech signals. In contrast, the system 10 described herein can employ an exemplary fast destination recognition technique if so desired. The fast destination recognition technique can be applied independently or in conjunction with other speech recognition techniques to increase processing efficiency and to improve the speech recognition accuracy.

The fast destination recognition methodology takes advantage of certain predictable characteristics of aviation communication. For example, aviation radio contact procedures require a specific format for initiating contact. More specifically, the name of the facility being called should always be the first piece of information delivered in a call. The fast destination recognition procedure presented here captures the first speech segment that occurs after a radio squelch (under the assumption that the initial speech segment should contain an utterance of the facility being contacted). The initial speech segment is analyzed to extract recognizable key information contained in a dynamically generated dictionary. The dynamic vocabulary dictionary is limited in size because it only contains key information that corresponds to destinations within a certain range of the aircraft's current position, as determined by the positional data of the host aircraft in an ongoing manner. Thus, the speech recognition module 14 need not analyze a large and voluminous database of potential key terms. Rather, the speech recognition module 14 can analyze a relatively compact, but dynamically generated, database that only contains key information that has been filtered in accordance with the current position of the aircraft. Thus, the system 10 need not waste any time searching for key terms that bear little to no practical significance.

The key information that is processed by the system 10 can include, without limitation: destination and source information, location information, altitude or flight level information, direction data, speed data, time information, radio frequency information, request or instruction information, etc. Moreover, the absence of a required communication can also be considered for purposes of checking compliance. In certain practical applications, source and destination information is deemed important for use with consistency checks, and the fast speech recognition methodology described above can be utilized to detect source and destination information. Additional key information can be identified by various speech recognition methods, and by data analysis methods, as appropriate to the particular embodiment.

Although the system 10 can monitor and analyze different types of communication during a consistency check, the features and functionality stressed herein relate to the monitoring of cockpit communication to verify compliance with applicable aviation regulations and operating procedures. In this regard, the following example represents one typical scenario in which the system 10 compares cockpit communication against key information associated with aviation regulations and operating procedures. Although the communication presented in the following example is voice radio based, the concept is also applicable to other means of communication.

Example Scenario

A pilot is flying a small airplane from Payson, Ariz. (airport identifier: KPAN) to Gila Bend, Ariz. (airport identifier: E63). After the transition to Scottsdale, Ariz. (airport identifier: KSDL) Class D airspace, the pilot tunes to the Phoenix Approach frequency planning for a Class B transition. However, the pilot notices that the Phoenix Approach is quite busy, and decides to re-route to the west to avoid the Class B airspace. The pilot notices the Luke Alert Area, and maintains altitude a little higher than 3,000 feet to keep clear of the Glendale Class D airspace and the 5,000 foot Phoenix Class B airspace bottom. The pilot tunes to the Glendale tower frequency and monitors the traffic information. The pilot also tunes to the Glendale ATIS frequencies, while muting the ATIS channel for better monitoring of tower transmissions, because the pilot is not planning to make the Class D transition.

At six miles away from Glendale, Ariz. (airport identifier: KGEU), the onboard system recognizes the Glendale altimeter setting of 29.40 from the muted VHF radio channel, and the consistency check function determines that the number is not applied correctly because the altimeter setting from Scottsdale 29.90 is still in use. At this time, a message is generated: "Verify altimeter setting—29.40 KGEU info U", accompanied by a tone or other warning sound.

At five miles away, the onboard system identifies an entry of Glendale Class D airspace with position, velocity, time, and corrected altitude. The operational consistency check function searches through the voice records but finds nothing associated with "Glendale Tower" in the outbound aircraft communication. Accordingly, an airspace violation is predicted, and the system generates a message: "Class D Airspace Violation". This message can be rendered along with other messages, and an audible alert can also be annunciated: "Contact Glendale Tower 121.0". For this example, therefore, the pilot can scan the display, become immediately aware of the situation, and resolve the conflict by quickly contacting the Glendale tower.

The system 10 can check for compliance with any number of different aviation regulations and operating procedures, subject to practical limitations and capacities of the hardware, software, and equipment. In practice, each aviation regulation and each aviation operating procedure of interest can be associated with a respective database object or entry in the database 30 (see FIG. 1). A database object corresponding to a given aviation regulation or operating procedure can include some or all of the following information, without limitation: a set of rules that govern or otherwise define the regulation or operating procedure; conditions/criteria that determine when the regulation or operating procedure is valid or applicable; time constraints or time limits applicable to stored key information to be analyzed for the regulation or operating procedure; a library of National Airspace System structure; navigational data; aviation system information; a library of words, phrases, letters, and/or character strings that represent the reference information associated with the regulation or operating procedure (wherein detected key information can be compared against the reference information); and data corresponding to alerts, messages, or responses to be generated in the event of detected noncompliance with the regulation or operating procedure.

A particular aviation regulation or operating procedure can be "universal" in that it has general applicability to all aircraft (or to a majority of aircraft). Conversely, a particular aviation regulation or operating procedure may have limited applicability. For example, one regulation or operating procedure can apply to certain classes of aircraft, while another regulation or operating procedure can apply to certain flight plans, destinations, or the like. The system 10 can "filter" the set of aviation regulations and operating procedures as needed such that only the applicable or relevant ones are considered at any given time.

Figure 2:
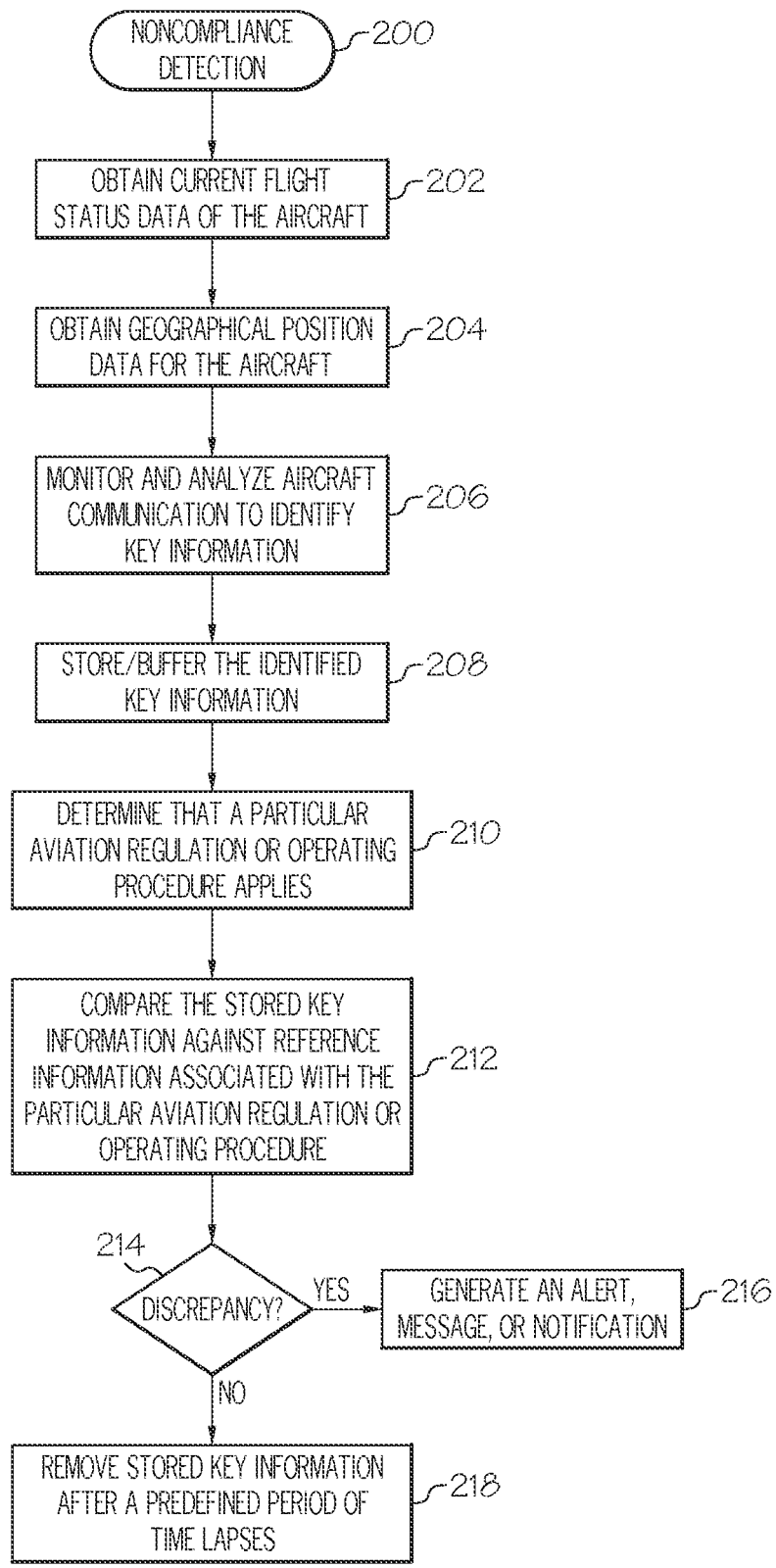
FIG. 2 is a flow chart that illustrates an exemplary embodiment of a computer-implemented process that detects noncompliance with aviation regulations and operating procedures.

FIG. 2 is a flow chart that illustrates an exemplary embodiment of a computer-implemented process 200 that detects noncompliance with aviation regulations and operating procedures. The various tasks performed in connection with the process 200 may be performed by software, hardware, firmware, or any combination thereof. For illustrative purposes, the following description of the process 200 may refer to elements mentioned above in connection with FIG. 1. It should be appreciated that the process 200 may include any number of additional or alternative tasks, the tasks shown in FIG. 2 need not be performed in the illustrated order, and the process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

The following description of the process 200 assumes that the system 10 has already been deployed, configured, and initialized for operation in the manner explained above. Moreover, the process 200 assumes that the database 30 has already been populated with the reference information needed to monitor the various aviation regulations and operating procedures of interest. During operation of the host aircraft, the process 200 can be performed in a virtually continuous manner at a relatively high refresh rate. For example, an iteration of the process 200 could be performed once every two seconds (or less) such that displays and/or other annunciating devices and components are updated in real-time or substantially real time in a dynamic manner during operation of the aircraft, and such that alerts can be generated as soon as noncompliance with an aviation regulation or operating procedure is detected.

The exemplary embodiment of the process 200 begins by obtaining the current flight status data of the host aircraft (task 202) and the current geographic position data for the aircraft (task 204). Tasks 202 and 204 can involve various sensors, devices, subsystems, and components onboard the host aircraft. Moreover, tasks 202 and 204 may leverage the functionality of onboard processing modules that provide navigation or flight plan data, terrain data, and the like. The process 200 monitors and analyzes aircraft communication (primarily outbound communication from the cockpit, but also inbound communication in certain situations) in an ongoing manner (task 206). For example, task 206 can analyze outbound communication from the host aircraft to identify key information contained in the outbound communication. Key information that is identified as being potentially relevant is stored or buffered in the data storage device 22 for an appropriate amount of time (task 208). As noted previously, the stored key information represents digital data that has been recognized by the system 10 as relating to one or more aviation regulations or operating procedures of interest (e.g., critical words, call letters, phrases, codes, or the like). The source (e.g., ATC, pilot, aircraft identifier) of the stored key information may also be stored in the data storage device 22 in association with the stored key information. In addition, time stamp data can be stored in association with the stored key information. If the communication is a voice communication (as opposed to a digital communication via the datalink system), then task 206 uses the speech recognition module 14 to perform speech recognition on the voice communication to generate or produce the digital data derived from the voice communication. If the communication is navigation radio information, then task 206 can identify the communication by analyzing Morse code content. If the communication is an electronic message (e.g., a datalink message transmitted from the host aircraft to an ATC system), then task 206 analyzes the electronic message to identify key information contained therein. Digital communications via the datalink system 28 may be directly stored in the data storage device 22 or, in some embodiments, digital communication from the datalink system 28 can be analyzed by the system 10 to recognize a word or phrase as corresponding to a particular aviation regulation or operating procedure. If the word or phrase is recognized in the digital communication from the datalink system 28, the digital communication may then be stored in the data storage device 22.

The process 200 also determines that a particular aviation regulation or operating procedure applies to the host aircraft (task 210). It should be appreciated that the process 200 can be designed to monitor and detect compliance with any number of regulations and operating procedures in a concurrent manner. For ease of description and for the sake of simplicity, this example focuses on only one regulation or operating procedure. Task 210 can analyze the current flight status data and/or the geographical position data collected at tasks 202 and 204. More specifically, the process 200 compares the obtained flight status data and/or the obtained position data against predetermined criteria associated with the aviation regulations and operating procedures of interest. In this regard, certain aviation regulations and operating procedures may be applicable only under relevant conditions (e.g., during takeoff, during approach, while transitioning from one class of airspace to another, etc.). Thus, task 210 checks whether the criteria for a given regulation or operating procedure has been satisfied. If so, then the process 200 can continue by checking the applicable regulation(s) and operating procedure(s). If not, then the process 200 need not waste time or processing resources and need not consider irrelevant regulations and operating procedures. Task 210 effectively serves as a triggering mechanism that manages the process 200 and that regulates which aviation regulations and operating procedures need to be verified for compliance at any given time.

As one example, assume that the aircraft is approaching a runway within Class D airspace, and is instructed "report four mile final" upon its first call to the tower. This type of instruction is commonly used to control air traffic. The system captures the incoming instruction and monitors the progress of the aircraft, along with the cockpit communication. If the system fails to identify an outbound call such as "xxx tower, xxx, four mile final" when the aircraft is approaching the four mile point, an appropriate annunciation is communicated to the flight crew.

As another example, assume that an inexperienced new pilot is planning a Class B transition, establishes radio communication with the tower, and the tower responded with "standby". Normally, for a Class D airspace transition, a "standby" implies that two-way communication has been established, and one can enter the Class D airspace. However, for Class B airspace, the required clearance is in the form of "cleared into Class Bravo airspace". Such clearance is required before the aircraft can enter Class B airspace. For this example, therefore, the system monitors the aircraft vector and predicts entry into the Class B airspace within fifteen seconds. However, the system detected an inbound "standby" communication, but did not detect an inbound "cleared into" communication. For this scenario, the system communicates the situation to the pilot such that the pilot can take appropriate action to avoid violating the Class B airspace.

Other applicable examples include scenarios where the system can be used to check aircraft altitude and assigned altitude along with ATC instructions for a Class B transition, while also monitoring the aircraft speed to confirm that the speed satisfies the maximum speed criteria for a Class B transition. In this context, certain aircraft regulations specify the maximum allowable speed for airspace transitions.

As yet another example, some Class D airspace degrades to Class G when the ATC controller is off duty. In such a situation, there will be no requirement for establishing two-way communication with the controller. However, the system can still monitor the current time and cross-check with the navigational database to determine if the controller is still offline at the moment of airspace transition. This may be desirable to remind the pilot if the airspace returns to Class D, and if the pilot did not contact the tower before entering the airspace.

This description assumes that one particular aviation regulation or operating procedure has been identified as being applicable to the current scenario and time frame. Accordingly, the process 200 continues by comparing at least some of the stored key information against the reference information maintained in the database 30 in association with the particular aviation regulation or operating procedure (task 212). In practice, task 212 need not consider all of the stored key information and, instead, task 212 can review stored key information that has been collected during a most recent period of time, e.g., the last ten minutes, the last hour, or the like. In some embodiments, older stored key information can be automatically deleted or removed, under the assumption that stale information is no longer relevant in an ongoing context (see task 218, which is described in more detail below). As mentioned above, the reference information that is used as the basis for comparison can include words, letters, phrases, codes, or character strings that represent any predetermined parameters. For example, the reference information for the particular aviation regulation or operating procedure can include, without limitation: an identifier of the host aircraft, such as the tail number; an identifier of an intended destination of the host aircraft, such as an airport identifier, a waypoint identifier, or the name of a city; an identifier of a commercial airline; the name or an identifier of the pilot or crew member; a value of a control, navigation, of flight parameter, such as a specified altitude, heading, airspeed, or pitch angle; flight plan settings; or the like.

If the comparison performed at task 212 results in a discrepancy between the stored key information and the reference information that corresponds to the particular aviation regulation or operating procedure under scrutiny (the "Yes" branch of query task 214), then the system 10 generates and provides a suitably formatted alert, message, or notification (task 216). If the system 10 outputs a discrepancy alert, the pilot is alerted to an error or noncompliance with a specified regulation or procedure, and the system 10 can request corrective action or compliance. It should be appreciated that a discrepancy alert may be produced using any technique or subsystem. For example, a visual discrepancy alert can be displayed on the display device 24, on a guidance panel, on an augmented reality display, on a head-up display, or the like.

If there is no discrepancy between the stored key information and the reference information (the "No" branch of query task 214), then the process 200 can continue by removing the stored key information. Removal of the stored key information may be performed after a predefined period of time lapses (task 218). In this regard, the stored key information can be maintained for analysis during one or more subsequent iterations of the process 200, or until the system 10 determines that the stored key information is no longer relevant to the current situation. Maintaining the stored key information for only a limited period of time is desirable to increase processing efficiency and to otherwise improve the performance of the system 10. It should be understood that removal of stored key information is not always necessary and that an embodiment of the system 10 can delete stored key information at any time (e.g., after completion of the current flight plan, after the aircraft is shutdown, after the data storage device 22 is full to capacity, or the like).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for detecting noncompliance with aviation regulations and operating procedures, the method comprising:
    analyzing communication associated with a host aircraft to identify key information contained in the communication;
    storing the identified key information in a data storage device to obtain stored key information;
    determining that a particular aviation regulation or operating procedure applies to the host aircraft;
    receiving, by a processor from a database, reference information that is associated with the particular aviation regulation or operating procedure;
    after the determining, comparing, by the processor, the stored key information against the reference information; and
    generating an alert when the comparing detects a discrepancy between the stored key information and the reference information.

2. The method of claim 1, wherein:
    the communication comprises a voice communication; and
    the analyzing step performs speech recognition on the voice communication to identify key information contained in the voice communication.

3. The method of claim 1, wherein:
    the communication comprises an electronic message transmitted from the host aircraft to an air traffic control system; and
    the analyzing step analyzes the electronic message to identify key information contained in the electronic message.

4. The method of claim 1, further comprising:
    removing the stored key information from the data storage device when the comparing step detects no discrepancy between the stored key information and the reference information.

5. The method of claim 1, wherein the determining step comprises:
    obtaining flight status data of the host aircraft; and
    comparing the obtained flight status data against predetermined criteria associated with the particular aviation regulation or operating procedure.

6. The method of claim 1, wherein the reference information for the particular aviation regulation or operating procedure comprises an identifier of the host aircraft.

7. The method of claim 1, wherein the reference information for the particular aviation regulation or operating procedure comprises an identifier of an intended destination of the host aircraft.

8. The method of claim 1, further comprising:
    maintaining the stored key information in the data storage device for a limited time period; and
    removing the stored key information from the data storage device after the limited time period lapses.

9. A tangible and non-transitory electronic storage medium having processor-executable instructions that, when executed by a processor architecture comprising at least one processor device, are capable of performing a method of detecting noncompliance with aviation regulations and operating procedures, the method comprising:
    analyzing communication associated with a host aircraft to identify key information contained in the communication;
    storing the identified key information in a data storage device to obtain stored key information;
    determining that a particular aviation regulation or operating procedure applies to the host aircraft;
    receiving reference information that is associated with the particular aviation regulation or operating procedure, the reference information being maintained in a database;
    after the determining, comparing the stored key information against the reference information; and
    generating an alert when the comparing detects a discrepancy between the stored key information and the reference information.

10. The storage medium of claim 9, wherein:
    the communication comprises a voice communication; and
    the analyzing step performs speech recognition on the voice communication to identify key information contained in the voice communication.

11. The storage medium of claim 9, wherein:
    the communication comprises an electronic message transmitted from the host aircraft to an air traffic control system; and
    the analyzing step analyzes the electronic message to identify key information contained in the electronic message.

12. The storage medium of claim 9, wherein the determining step comprises:
    obtaining flight status data of the host aircraft; and
    comparing the obtained flight status data against predetermined criteria associated with the particular aviation regulation or operating procedure.

13. The storage medium of claim 9, wherein the method further comprises:
    maintaining the stored key information in the data storage device for a limited time period; and
    removing the stored key information from the data storage device after the limited time period lapses.

14. A computer-implemented system for detecting noncompliance with aviation regulations and operating procedures, the system comprising:
    a processor architecture comprising at least one processor device; and
    at least one data storage device associated with the processor architecture, the at least one data storage device storing processor-executable instructions that, when executed by the processor architecture, perform a method of detecting noncompliance with aviation regulations and operating procedures, the method comprising:

analyzing communication associated with a host aircraft to identify key information contained in the communication;

storing the identified key information in a data storage device to obtain stored key information;

determining that a particular aviation regulation or operating procedure applies to the host aircraft;

receiving, by the at least one processor device, reference information that is associated with the particular aviation regulation or operating procedure, the reference information being maintained in a database;

after the determining, comparing the stored key information against the reference information; and generating an alert when the comparing detects a discrepancy between the stored key information and the reference information.

15. The system of claim 14, wherein:
the communication comprises a voice communication; and
the analyzing step performs speech recognition on the voice communication to identify key information contained in the voice communication.

16. The system of claim 14, wherein:
the communication comprises an electronic message transmitted from the host aircraft to an air traffic control system; and
the analyzing step analyzes the electronic message to identify key information contained in the electronic message.

17. The system of claim 14, wherein the determining step comprises:
obtaining flight status data of the host aircraft; and
comparing the obtained flight status data against predetermined criteria associated with the particular aviation regulation or operating procedure.

18. The system of claim 14, wherein the reference information for the particular aviation regulation or operating procedure comprises an identifier of the host aircraft.

19. The system of claim 14, wherein the reference information for the particular aviation regulation or operating procedure comprises an identifier of an intended destination of the host aircraft.

20. The system of claim 14, wherein:
the stored key information is maintained in the data storage device for a limited time period; and
the stored key information is removed from the data storage device after the limited time period lapses.

* * * * *